March 4, 1952     D. F. AYRES     2,587,680
MILKING MACHINE
Filed April 10, 1947
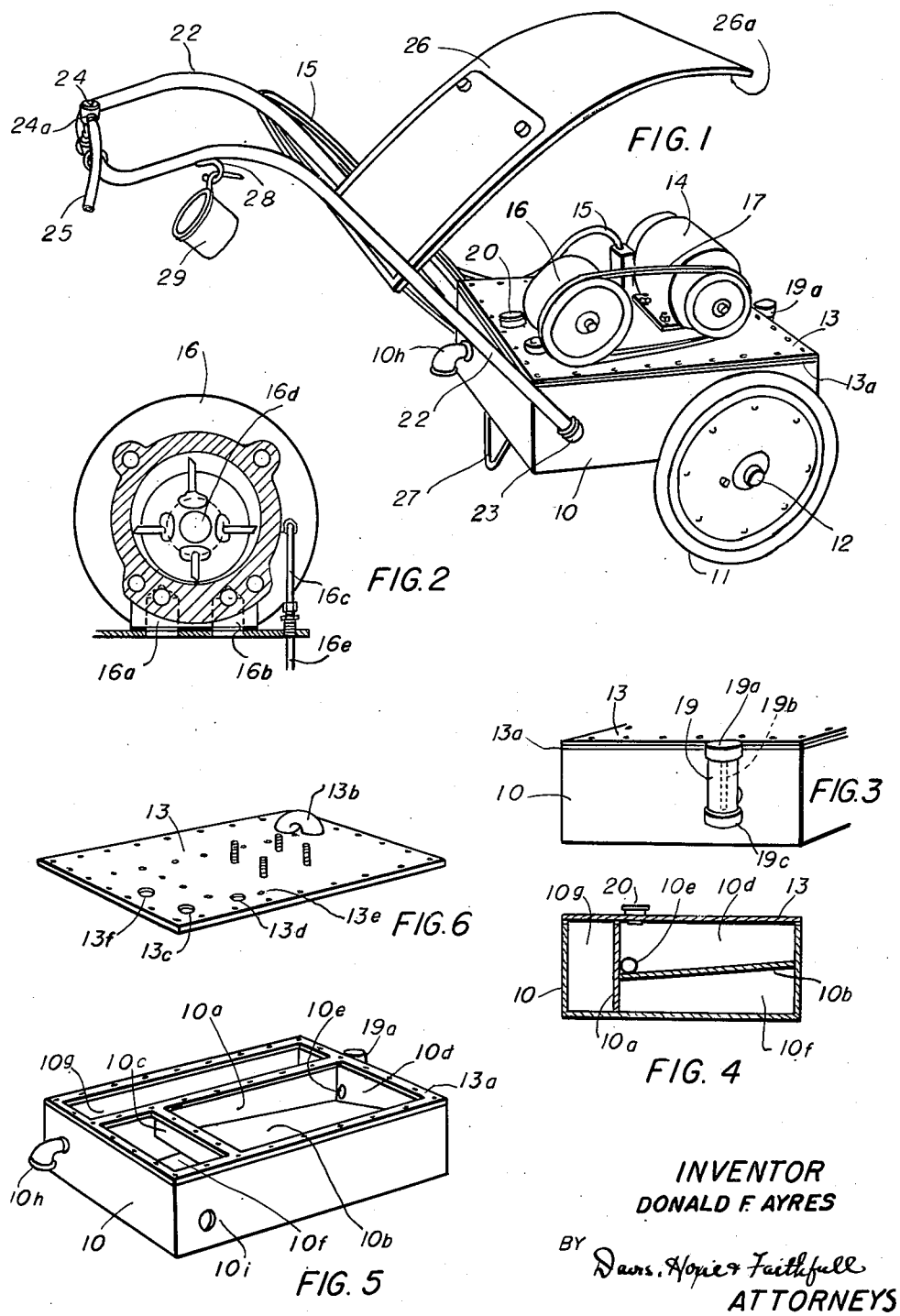
INVENTOR
DONALD F. AYRES
BY Davis, Hoyer & Faithfull
ATTORNEYS Patented Mar. 4, 1952

2,587,680

UNITED STATES PATENT OFFICE 2,587,680

MILKING MACHINE

Donald F. Ayres, Poughkeepsie, N. Y., assignor to The De Laval Separator Company, New York, N. Y., a corporation of New Jersey Application April 10, 1947, Serial No. 740,529

5 Claims. (Cl. 230—235)

This invention relates to milking machines and has particular reference to a machine of this type having a hollow base of novel construction which supports the vacuum pump of the milker system and also provides a series of compartments arranged to form integral parts of the inlet connection to, and the outlet connection from, the vacuum pump.

One object of the present invention resides in the provision of a milking machine in which the vacuum pump is mounted on a hollow base defining a "sani-trap" chamber for the milker vacuum line and also defining a separate oil chamber, the chambers being interconnected through the pump and a cover for the hollow base.

Another object is to provide a milking machine of the character described, in which the "sani-trap" chamber extends downwardly from the base cover and under the oil chamber or reservoir, whereby the base may be made in a compact form while providing ample space for the "sani-trap" and reservoir.

A further object is to provide a milking machine of the character described, in which the bottom of the oil reservoir slopes downwardly to an oil gauge mounted on the outside of the base, the gauge serving as a means for filling or emptying the oil reservoir and also for determining the oil level therein.

Still another object is to provide a milking machine in which the vacuum pump is mounted on a hollow base having two serially connected chambers, one of which constitutes an oil reservoir connected to the pump outlet through the base cover, and the other of which forms a muffler for the air exhaust from the reservoir.

An additional object is to provide a milking machine of the character described, in which the hollow base for the vacuum pump is partitioned internally to form three separate chambers, namely, a "sani-trap" in the milker vacuum line, an oil reservoir communicating with the pump outlet, and a muffler chamber for exhausting the air from the reservoir.

These and other objects of the invention may be better understood by reference to the accompanying drawing, in which:

Fig. 1 is a perspective view of a portable milking machine embodying the invention;

Fig. 2 is a sectional view of the vacuum pump, showing the pump inlet and outlet and also a passage for supplying oil to the pump;

Fig. 3 is a perspective view of one end of the hollow base, showing the oil gauge;

Fig. 4 is a vertical sectional view of the hollow base;

Fig. 5 is a perspective view of the hollow base, with the cover removed, and

Fig. 6 is a perspective view of the cover.

Referring to the drawing, the milking machine comprises a hollow base 10 having wheels 11 mounted on an axle 12 secured to the base. The base 10 is of a box-like construction having a rectangular bottom and opposing side and end walls, each of which may be a metal plate welded or otherwise connected to the adjoining plates to form an air-tight structure. The top of the box is closed by a movable cover 13 which is secured in position in any suitable manner, a gasket 13a being preferably interposed between the cover and the side walls to make the base air-tight.

Mounted on top of the cover 13 is a motor 14, which may be an electric motor energized through a flexible cable 15. A vacuum pump 16 is also mounted on top of the cover 13 and is driven from the motor by a belt 17. The vacuum pump 16 (Fig. 2) is of the type in which the inlet 16a and the outlet 16b are located at the bottom of the pump housing, a pump of this type being disclosed in a co-pending application of C. H. Hapgood, Ser. No. 597,074, filed June 1, 1945, now Patent No. 2,463,871. The pump housing has a generally vertical pipe 16c extending downward from the vicinity of the bearing at one end of the rotor shaft 16d, and a tube 16e extends from the lower end of the oil pipe 16c through an opening 13e in the cover 13, as will be described in detail presently.

Within the hollow base 10 is a vertical, longitudinal partition 10a parallel to the side walls. A generally horizontal partition 10b extends from the partition 10a to the more remote of the two side walls. The partition 10b is located intermediate the top and bottom of the base and is connected at one end to one of the end walls of the base. At its other end, the partition 10b terminates short of the opposite end wall of the base and joins a vertical partition 10c extending to the top of the base, the ends of the partition 10c joining the vertical partition 10a and the side wall to which the partition 10b is connected. The vertical partitions 10a and 10c are provided at the top with extensions of the gasket 13a. Also, the metal-to-metal joints at the edges of the partitions are made air-tight.

The vertical partitions 10a and 10c and the partition 10b partly define a chamber 10d which serves as an oil reservoir, the bottom 10b of which is slightly inclined so that the oil will tend to drain down toward an opening 10e in the adjacent end wall. The oil tube 16e extends down into the oil reservoir 10d through the cover opening 13e, while the outlet 16b of the pump leads down into the oil reservoir through opening 13d in the cover.

The generally horizontal partition 10b divides the oil reservoir 10d from a chamber 10f in the lower part of the base. The latter chamber serves as a "sani-trap," as will be described in greater detail presently, and communicates with the pump inlet 16a through opening 13c in the cover.

The vertical partition 10a forms one wall of a chamber 10g located on the opposite side of this partition from chambers 10d and 10f. The chamber 10g serves as an exhaust or muffler and communicates with the oil reservoir 10d through an elbow 13b on the cover 13. Air in the muffler 10g is exhausted from the base through a downwardly directed pipe 10h.

The opening 10e from the oil reservoir 10d leads to an oil gauge 19 having at its upper end a removable cap 19a provided with a stem 19b extending down into the interior of the gauge, whereby the oil level in the reservoir may be readily determined by removing the cap. Also, by removing the cap 19a, the supply of oil in the reservoir 10d may be replenished through the gauge. A removable cap 19c is mounted on the lower end of the gauge, and by removing this cap the oil may be drained from the reservoir.

A vacuum regulator 20, which may be of any conventional form, is mounted on the cover 13 and communicates with the "sani-trap" 10f through an opening 13f in the cover. The regulator 20 operates automatically to admit air through cover opening 13f, if the sub-atmospheric pressure in the "sani-trap" 10f should become too low due to withdrawal of air by the vacuum pump through cover opening 13c.

A handle 22 is connected to the base 10 and is used by the operator in moving the portable milker from one location to another. The handle 22 is hollow and is preferably made from metal piping. As shown, the handle is U-shaped and is connected at its ends to the base, one end being connected through an elbow 23 which is welded or otherwise secured over an opening 10i in one side wall of the base. The opening 10i leads into the "sani-trap" 10f above the bottom level thereof and communicates with the inlet 16a of the pump through the cover opening 13c. The other end (not shown) of the handle 22 is connected to the opposite side wall of the base but is closed from the interior of the base.

A connecting device in the form of a stall cock 24 is mounted on the transverse portion of the handle 22 so as to communicate with the interior of the handle, the device 24 being preferably of the type disclosed in Scott Patent No. 2,251,071 dated July 29, 1941. The flexible hose 25 of the milker unit, when applied to the nipple 24a of the stall cock, is connected to the pump inlet 16a through handle 22, "sani-trap" 10f and cover opening 13c, whereby the milker unit is "vacuum" operated in the usual manner.

A platform 26 is hinged to the legs of the handle 22, the free end 26a of the platform being curved downwardly so that when the free-end is lowered it will rest upon the cover 13 of the base. In its lowered position, the platform 26 serves as a support for the milker unit. A leg 27 is secured to the bottom of the base 10 at the end thereof adjacent the handle 22 and serves to support the base when it is stationary. The handle 22 may be provided with a hook 28 for holding a strip cup 29.

In operation, air withdrawn from the milker unit through stall cock 24 passes down through the hollow handle 22 and the elbow 23 into the "sani-trap" 10f, where dust and other particles in the air will settle to the bottom. The air will then flow up through cover opening 13c to the pump inlet 16a, the compressed air being exhausted from the pump through outlet 16b from which it flows down through cover opening 13d into the oil reservoir 10d. There, a separation of oil from the air occurs, the air then passing through elbow 13b into the muffler 10g from which it is exhausted through pipe 10h. During operation of the pump 16, its rotor assembly is constantly supplied with oil from tube 16e, the lower end of which is below the oil level in reservoir 10d. Since the pressure in the rotor chamber at the end of pipe 16c is lower than that in the reservoir chamber 10d, oil will be forced up through tube 16e and pipe 16c to the rotor chamber where it serves as a lubricating and sealing medium, the oil returning to the reservoir through pump outlet 16b.

It will be apparent from the foregoing that the base 10, in addition to supporting the vacuum pump and its motor, provides a sizable compartment 10f for trapping solid particles in the milker vacuum line, before they can reach the pump, and also provides an oil reservoir and an exhaust muffler for the pump. At the same time, the base 10 is in a compact form which can be easily transported if desired. Access to the interior of the base may be obtained easily by removing the cover 13, which forms the connections between the pump and the chambers 10f and 10d and also the connection between the latter chamber and the muffler.

While I have illustrated the invention in the form of a portable milking machine, it may also be used in milking machines of the stationary type.

It is to be understood that the construction by which the hollow handle 22 constitutes an integral part of the vacuum line from the pump to the milker unit through hose 25, forms no part of the present invention, such a construction being disclosed and claimed in a co-pending application of Arnold I. Terpening, Serial No. 740,620, filed April 10, 1947, now Patent No. 2,482,602.

I claim:

1. In a milking machine, a hollow base having a top and a bottom, a vacuum pump mounted on said top and having an air inlet and an air outlet, a generally horizontal partition in the base disposed intermediate the top and the bottom thereof and dividing at least part of the interior of the base into upper and lower chambers, the lower chamber being connected to said inlet and forming a trap to collect particles in the air passing to said inlet, the upper chamber being connected to said outlet and forming an oil reservoir, the base having an air exhaust opening communicating with said upper chamber, and a milker vacuum line connected to the base and opening into said lower chamber.

2. A milking machine as defined in claim 1, in which the base contains a partition partly defining a third chamber forming a muffler between said second chamber and said air exhaust opening.

3. A milking machine as defined in claim 1, in which the base has an oil opening communicating with said upper chamber, said generally horizontal partition sloping downward to said oil opening.

4. An assembly for milking machines, which comprises a hollow base having a top, a generally horizontal partition in the base forming the bottom of an oil chamber and the top of a sani-trap chamber in the base, a generally vertical partition extending upwardly to the top of the base from a free edge of the first partition and partly defining a vertical extension of the sani-trap chamber, there being an air inlet in the base opening into the sani-trap chamber above the bottom thereof, the top of the base having an air outlet opening from the sani-trap chamber and an air inlet opening to the oil chamber, a second generally vertical partition forming a wall of said chambers and extending from the top of the base to the bottom of the base, there being a muffler chamber in the base on the side of said last partition opposite the first two chambers, the base having an air exhaust opening from the muffler chamber, and a duct leading from the upper part of the oil chamber to said muffler chamber.

5. An assembly for milking machines, which comprises a hollow base having a top and a bottom, a generally horizontal partition in the base forming the bottom of an oil chamber and the top of a sani-trap chamber within the base, the top of the base having an air outlet opening from the sani-trap chamber and an air inlet opening to the oil chamber, the base also having an air inlet opening into the sani-trap chamber above the bottom thereof and adapted for connection to a milker vacuum line, and having an air exhaust opening from the oil chamber above the bottom thereof, and a generally vertical partition extending upward from a free edge of said horizontal partition and partly defining a vertical continuation of the sani-trap chamber leading up to said outlet opening in the top of the base.

DONALD F. AYRES.

REFERENCES CITED

The following references are of record in the file of this patent:

UNITED STATES PATENTS

| Number | Name | Date |
| --- | --- | --- |
| 1,261,358 | Cagnino | Apr. 2, 1918 |
| 1,329,281 | Zingsheim | Jan. 27, 1920 |
| 1,591,522 | French | July 6, 1926 |
| 1,856,826 | Bennett | May 3, 1932 |
| 2,251,071 | Scott | July 29, 1941 |
| 2,314,438 | Banning et al. | Mar. 23, 1943 |
| 2,463,871 | Hapgood | Mar. 8, 1949 |
| 2,482,602 | Terpening | Sept. 20, 1949 |